United States Patent
Ludden

(10) Patent No.: US 9,880,258 B2
(45) Date of Patent: Jan. 30, 2018

(54) LOCATION ESTIMATION IN A COMMUNICATION NETWORK

(71) Applicant: VODAFONE IP LICENSING LIMITED, Newbury, Berkshire (GB)

(72) Inventor: Brendan Ludden, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/165,271

(22) Filed: May 26, 2016

(65) Prior Publication Data

US 2016/0349351 A1 Dec. 1, 2016

(30) Foreign Application Priority Data

May 28, 2015 (GB) .................................. 1509175.4

(51) Int. Cl.
*G01S 5/02* (2010.01)
*G01S 5/00* (2006.01)
*H04W 4/02* (2009.01)
*H04W 64/00* (2009.01)
*G01S 11/08* (2006.01)

(52) U.S. Cl.
CPC .............. *G01S 5/0294* (2013.01); *G01S 5/00* (2013.01); *G01S 5/0027* (2013.01); *G01S 11/08* (2013.01); *H04W 4/028* (2013.01); *H04W 64/00* (2013.01)

(58) Field of Classification Search
CPC ........ G01S 5/0294; G01S 5/00; G01S 5/0027; H04L 67/18; H04W 4/028; H04W 64/00
See application file for complete search history.

(56) References Cited

U.S. PATENT DOCUMENTS

| 8,559,976 B2 | 10/2013 | Miyake et al. |
| 2008/0065752 A1* | 3/2008 | Ch'ng ................... H04W 24/02 709/223 |
| 2010/0137003 A1 | 6/2010 | Goldfarb |

(Continued)

FOREIGN PATENT DOCUMENTS

WO    WO2014/209613 A1    12/2014

OTHER PUBLICATIONS

European Search Report for EP 16 17 1427 dated Sep. 27, 2016.
UK—Priority Application Combined Search & Exam Report for GB1509175.4 dated Nov. 23, 2015.

*Primary Examiner* — Thai Vu
(74) *Attorney, Agent, or Firm* — Workman Nydegger

(57) ABSTRACT

A method, apparatus and computer program are provided for estimating a characteristic static location of a user equipment in a wireless communication network comprising a plurality of network nodes for transmitting radio signals. Each network node has an associated cell corresponding to a predicted geographical coverage area of a corresponding transmitted radio signal. Location event data for the user equipment provides a cell-specific location for the user equipment at a point in time. A plurality of event frequencies is determined for the user equipment, each corresponding to a cumulative number of received location events locating the user equipment in a respective cell/sector in a given time interval. A characteristic static location is calculated using a combined measure of at least two non-zero values of the plurality of event frequencies corresponding respectively to at least two different cells or sectors.

12 Claims, 7 Drawing Sheets

(56) References Cited

U.S. PATENT DOCUMENTS

| | | | |
|---|---|---|---|
| 2012/0088525 A1* | 4/2012 | Kurokawa | H04W 4/028 |
| | | | 455/456.5 |
| 2012/0289186 A1 | 11/2012 | Ayalar | |
| 2014/0073317 A1* | 3/2014 | Zhou | H04W 28/0205 |
| | | | 455/424 |
| 2014/0222570 A1 | 8/2014 | Devoites et al. | |
| 2016/0057697 A1* | 2/2016 | Sirotkin | H04W 48/14 |
| | | | 370/331 |

* cited by examiner

LOCATION ESTIMATION IN A COMMUNICATION NETWORK

CROSS REFERENCE TO RELATED APPLICATIONS

This application claims priority to GB Application Number 1509175.4, filed on May 28, 2015, the entirety of which is incorporated herein by reference.

FIELD OF THE INVENTION

The present invention relates to an apparatus, method and computer program for static location estimation of mobile terminals in a communication network.

BACKGROUND OF THE INVENTION

Cellular telecommunications networks characteristically provide "cells" of radio communication coverage between communication devices (which are typically mobile) and a core network (with a "downlink" from core network to communication device and an "uplink" in the opposite direction).

Various radio access technologies (RATs) are implemented: currently digital cellular networks are the most common and these are loosely classed as second generation (2G), third generation (3G), fourth generation (4G), etc. technologies according to whether the RAT achieves effective data communications that meet increasingly challenging requirements. Included in the 4G standards are the third generation partnership project (3GPP) long term evolution (LTE) and LTE-Advanced (LTE-A), which correspond to release 10 and later of the 3GPP standards. Legacy 1G systems used analogue radio transmission of mainly voice data, whereas 2G systems utilise digital radio transmission. Earlier 2G wireless communication systems used only circuit switching, but later 2.5G systems used both circuit and packet switching, as do 3G systems. 4G and LTE/LTE-A technologies are solely packet-switched, with circuit-switched fall-back to earlier technologies.

The way that the information is communicated on the radio waves differs between the different generations. 3G technologies use Code Division Multiple Access (CDMA) modulation and a hybrid core network that treats data and voice differently. CDMA employs spread-spectrum technology (transmission bandwidth greater than frequency content of original information) and a coding scheme where each transmitter is assigned a code, allowing several transmitters to send information simultaneously over a single communication channel. 4G technologies use Orthogonal Frequency Division Multiple Access (OFDMA) modulation on the downlink (SD-FDMA on the uplink) and an Internet Protocol (IP) core network to communicate both data and voice. OFDM is a frequency-division multiplexing scheme in which a large number of orthogonal sub-carrier signals carry data on parallel data streams or channels. Each sub-carrier is modulated at a low symbol rate giving a total data rate similar to a conventional single-carrier modulation scheme in the same bandwidth. OFDMA and SD-FDMA use very similar computational structures. The LTE wireless interface is incompatible with 2G and 3G networks, so it is operated on a separate wireless spectrum.

To ensure effective coverage of a large geographic area, a plurality of cells are provided by respective network nodes, referred to in 2G as base transceiver stations (BTS) or base stations, referred to in 3G as NodeBs and referred to in 4G as evolved nodeBs or eNodeBs or eNBs. Network nodes such as eNodeBs are associated with one or more antenna arrays which in turn establish respective "cells". A network node may be referred to as a "cell site", which is different from the cell per se (i.e. the coverage area). In the simple case of an omnidirectional antenna being associated with each network node, each network node has a corresponding associated cell corresponding to a geographical coverage of the radio signal from the antenna. However, some network nodes comprise multi-directional antenna, with each antenna covering a so-called "sector" of a cell. For example, for a tri-directional antenna, each antenna may cover a 120° sector of a cell. The cells are logical constructs intended to simplistically represent a complex object corresponding to a geographical area covered by a radio antenna. The cells correspond to coverage areas where it is statistically likely for a UE to connect to the corresponding network node (i.e. transmitting antenna). For a sectored cell a circle is drawn to encompass the pie shape corresponding to an individual sector and the cell centroid according to the present technique is the centre of that circle.

The network nodes are controlled at least in part by other entities in the core network known as controllers. In 2G technologies the controllers are base station controllers (BSC); in 3G the controllers are radio network controllers (RNC); and in 4G LTE and LTE-A technologies there is a flatter architecture without a BSC or an RNC and the eNodeB (4G network node) includes radio resource management functionality. In LTE and LTE-A, the eNodeB is connected to an Evolved Packet Core (EPC) via a mobile management entity (MME) for control plane signalling and a Serving Gateway (S-GW) for user plane data. In wireless communication systems the BTS, NodeB or eNodeB has a first (radio) interface to the mobile station (or user equipment UE) and a second interface to the core network.

The interface between the BTS/NodeB/eNodeB and the core network is known as the backhaul interface or backhaul link. In 4G networks there is a single Ethernet cable connecting an eNodeB to an IP backhaul network. In LTE/LTE-A the backhaul link comprises both an "S1" interface which links the eNodeB to the evolved Packet Core and an "X2" interface that allows signalling between different eNodeBs. Both signalling and application data are communicated on the backhaul link. Currently, the physical backhaul interface is likely to be a Time Division Multiplexing (TDM) interface or an Ethernet interface. The X2 interface is not present in GSM (2G) or WCDMA (3G). In LTE, the X2 interface is only used for direct handovers between neighbouring eNodeB. For such direct handovers, the destination eNodeB co-ordinates with the S-GW/MME to shift traffic (that is being sent over the X2 interface during the handover) from the source eNodeB to the S1 interface for the destination eNodeB. There can be a large number of neighbours for each eNodeB (e.g. up to 32) and the set of neighbours for a given eNodeB is unique and dynamic such that a given eNodeB may have a set of radio neighbours that changes over time.

It is known to estimate the location of a mobile terminal at a given time using a cell identifier (ID) of the cell that the mobile terminal is connected to at that time. However, this method of location estimation has limited accuracy because it estimates the same location for all mobile terminals connected to the same cell i.e., the centre of the predicted coverage area of the cell commonly referred to as the cell centroid. It is also known to estimate a home location for a mobile terminal to be the cell centroid having the highest amount of phone activity overnight. The centroid is the geometric centre of a shape such as a circle or a polygon and corresponds to the arithmetic mean of all points in the shape.

There is a requirement to provide an efficient yet more accurate system for estimating a static location such as a home location for a mobile terminal.

BRIEF SUMMARY OF THE DISCLOSURE

According to a first aspect, the present invention provides a method for estimating a characteristic static location of a user equipment in a wireless communication network comprising a plurality of network nodes for transmitting radio signals, each network node having an associated cell corresponding to a predicted geographical coverage area of a corresponding transmitted radio signal, the method comprising:
- receiving location event data for the user equipment, each of a plurality of location events of the location event data providing a cell-specific location for the user equipment at a point in time;
- determining a plurality of event frequencies for the user equipment, each event frequency corresponding to a cumulative number of received location events locating the user equipment in a respective cell and/or sector in a given time interval;
- calculating the characteristic static location using a combined measure of at least two non-zero values of the plurality of event frequencies corresponding respectively to at least two different cells or sectors.

Use of a combined measure of two or more event frequencies having non-zero values and associated with different cells and/or sectors provides a more accurate static characteristic location estimate than simply selecting a central point in a coverage area of cell having the most frequent event observations in a given period of time (e.g. events logged between certain hours of the day averaged over a fixed number of days). The combined measure may, for example, identify a point in an overlapping region of cell coverage areas as a characteristic location depending upon the relative number of events in the different cells/sectors. Alternatively the combined measure may comprise weighting co-ordinates in each cell/sector depending upon, for example, event observation frequencies in the different cells/sectors. The static location according to the present technique differs from a dynamically mapped trajectory/ route corresponding to a journey embarked on by the user equipment. The use of the combined measure is both computationally efficient and memory efficient, yet is more accurate than known static location estimation methods. It exploits complex computational analysis that is performed in any event by the wireless communication network for the different purpose of calculating cell coverage areas and cell centres. The computational efficiency makes the technique viable for use with large volumes of data such as cell ID location data.

In some embodiments the at least two non-zero values of the plurality of event frequencies correspond to two at least partially overlapping cells or sectors.

In some embodiments the combined measure of event observation frequencies comprises determining the characteristic static location to be in an overlap region of the two at least partially overlapping cells when a difference between respective event frequencies for the two different cells or sectors is less than a predetermined threshold.

In alternative embodiments the combined measure of event frequencies is a weighted mean of spatial coordinates corresponding to the at least two different cells or sectors, wherein the weightings depend upon the event observation frequencies.

In some embodiments the spatial coordinates for the weighted mean comprise coordinates of a centroid of the respective cell or sector.

In some embodiments the weightings depend upon an observed dwell time of the user equipment in a respective cell/sector of the at least two different cells/sectors.

In some embodiments the weightings depend upon a cell/sector radius of the at least two different cells/sectors.

In some embodiments the weightings depend upon a number of consecutive location events for the respective cell or sector.

In some embodiments the cell-specific location comprises a unique cell identifier. In some such embodiments the unique cell identifier corresponds to a sector served by one direction of a multi-directional antenna.

In some embodiments the observation events correspond to at least one of: a call being received at the user equipment, a call being transmitted from the user equipment, sending of a short messaging service message, a periodic location area update for the UE and a Packet Data Protocol context setup for the user equipment.

In some embodiments the characteristic static cell location corresponds to a home cell and wherein one of the at least two non-zero values corresponds to a highest incidence cell having a highest frequency count for event observations in the given time interval.

In some embodiments the combined measure of at least two non-zero values of the plurality of event frequencies comprises three or more non-zero values corresponding to the highest incidence cell and two or more cells, each having at least a partial overlap with the highest incidence cell.

In some embodiments the wireless communication network is a heterogeneous network comprising at least two cell types selected from macrocells, microcells, picocells and femtocells and wherein the at least two different cells comprise different cell types.

According to a second aspect, the present invention provides an apparatus for estimating a characteristic static location of a user equipment in a wireless communication network comprising a plurality of network nodes for transmitting radio signals, each network node having an associated cell corresponding to a predicted geographical coverage area of a corresponding transmitted radio signal, the apparatus comprising an analytics module having a processor configured to:
- receive location event data for the user equipment, each of a plurality of location events of the location event data providing a cell-specific location for the user equipment at a point in time;
- determine a plurality of event frequencies for the user equipment, each event frequency corresponding to a cumulative number of received location events locating the user equipment in a respective cell and/or sector in a given time interval;
- calculate the characteristic static location using a combined measure of at least two non-zero values of the plurality of event frequencies corresponding respectively to at least two different cells or sectors.

According to a third aspect, the present invention provides computer program product embodied on a computer-readable medium comprising program instructions configured such that when executed by processing circuitry causes the processing circuitry to implement the method of the first aspect or any of its alternative embodiments described above.

Various respective aspects and features of the present disclosure are defined in the appended claims.

BRIEF DESCRIPTION OF THE DRAWINGS

Embodiments of the invention are further described hereinafter with reference to the accompanying drawings, in which.

DETAILED DESCRIPTION

Figure 1:
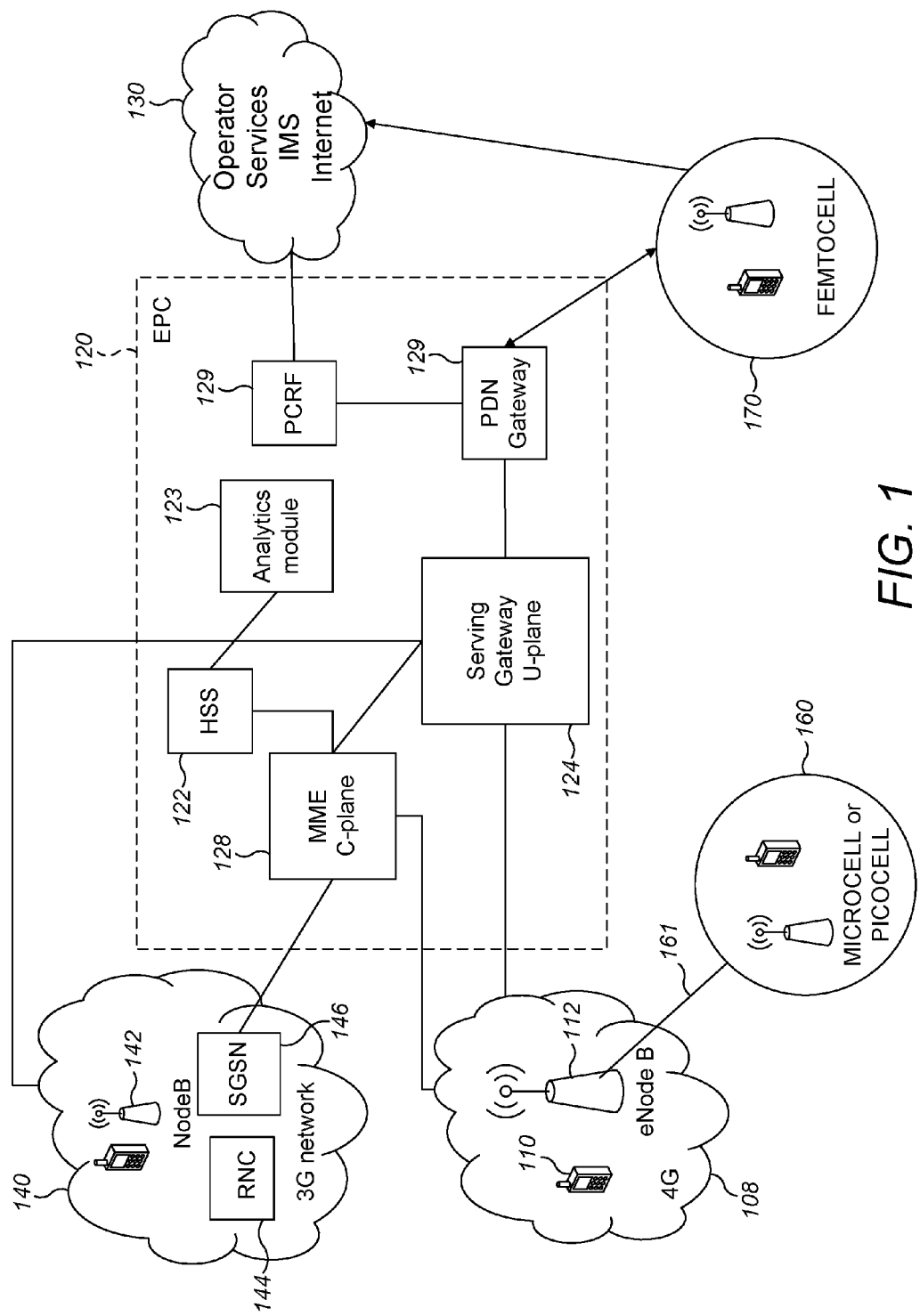
FIG. 1 schematically illustrates a wireless communication system.

FIG. 1 schematically illustrates a wireless communication system. The system comprises a User Equipment (UE) 110 connected to an EPC 120 via an eNodeB 112. The EPC 120 comprises the following network elements: a Home Subscriber Server (HSS) 122; an analytics module 123; a serving gateway 124; a Packet Data Network (PDN) gateway 126; Mobility Management Entity (MME) 128; and a Policy and Charging Rules Function Server (PCRF) 129. The analytic module 123 is provided according to the present technique and although it is located within the EPC in the embodiment of FIG. 1, it could alternatively be located outside or at least partially outside the EPC 120.

The HSS 122 is a database storing user and subscriber related data and provides support functions in call setup, user authentication and access authorization. The HSS 122 has a Home Location Register (HLR) function for storing and updating a database comprising user subscription information. The HLR performs user identification and addressing and makes use of an International Mobile Subscriber Identity (IMSI) and a Mobile Subscriber ISDN Number (MSISDN) or mobile telephone number. The HLR also comprises user profile information such as server subscription rates and user-subscribed Quality of Service information. The HSS 122 also performs an Authentication Centre (AuC) function whereby security information is generated from user identity keys. The security information is used for mutual network terminal authentication and to encipher/protect an information signal passing between the network and the terminal against alteration and/or eavesdropping.

The Serving Gateway 124 deals with user plane (U-plane) data and serves the UE 110 by routing incoming and outgoing internet protocol (IP) packets and connects the cellular radio communication side to the EPC 120. The PDN gateway 126 also deals with user plane data and connects the EPC 120 to external IP networks and may also perform IP address allocation, policy control and charging.

The MME 128 handles control plane (C-plane) data and deals with all control plane functions related to subscriber and session management. The MME 128 supports: security procedures relating to user authentication and negotiation of encryption algorithms; terminal-to-terminal session handling including signalling procedures for setting up packet data context and quality of service parameters; and idle terminal location management relating to a tracking area update process.

The EPC 120 may also be connected to external networks such as an Operator Services IP Multimedia Core Network Subsystem (Operator Services IMS) and the Internet 130. 3GPP also specifies support for access to the EPC via radio access technologies pre-dating LTE as shown in FIG. 1, where the EPC 120 is accessible to a 3G network 140, in which a UE 141 connects via a NodeB 142 and a Radio Network Controller (RNC) 144, via a Serving GPRS Support Node SGSN 146. The 3G radio access network 140 may be, for example, the radio access network of UMTS-based technologies such as Wideband Code Division Multiple Access (WCDMA) and High Speed Packet Access (HSPA).

Access to the wireless communication system of FIG. 1 is possible via a microcell and or a picocell 160 communicating via a backhaul link 161 to the eNB 112 of the 4G network. The microcell/picocell may alternatively connect to the EPC 120 via the 3G network 140. Access to network services via a femtocell 170 is also supported via the PDN gateway 126 and the Internet.

The wireless communication system of FIG. 1 also allows non-3GPP technologies (not shown) to be connected to the UE 100 and the EPC 110. Non-3GPP technologies are those not currently specified by 3GPP standards and include, for example, WiMAX (IEEE 802.16), Wi-Fi (IEEE 802.11) or fixed networks. WiMAX has a wider range than Wi-Fi.

For the UE 110 to connect to the EPC 120, appropriate network nodes like the appropriate serving gateway 124 and the appropriate PDN gateway 126 should be supported. To do this, an information element known as an Access Point Name (APN) is used to identify a target PDN and a protocol type towards the PDN gateway 126 (e.g. GPRS tunnelling protocol). The APN specifies a mandatory network identifier, which defines the PDN to which the UE requests connectivity and may also specify a service requested by the UE. The APN also comprises an optional operator identifier, defining the specific operator's packet domain. When the UE 100 makes a data connection to the EPC 120, the connection is made by presenting an APN to the 4G network 108. The network can use the APN to determine the characteristics of the network connection and to determine which IP addresses should be assigned to the UE.

The function of the analytics module 123 is to obtain from the wireless network UE location event observations associated with, for example, a received call, a sent Short Messaging Service (SMS) message, a location area update or a Packet data Protocol (PDP) context setup. The event observations may be obtained from the HSS 122, for example. The analytics module 123 analyses the UE event observations and uses them to perform a static UE location estimate. The analytics module 123 comprises a processor (not shown) for performing data analysis and calculations according to the present technique.

A static location estimate is to be contrasted with an estimate for a journey trajectory corresponding to a travel route. Examples of a static location include a home location, a work location, a school location and a holiday location and such like. Static locations correspond to a most likely UE location within a finite time period. This is estimated depending upon the UE location event observations that are typically logged by the wireless communication network for other purposes such as billing and handover.

Figure 2:
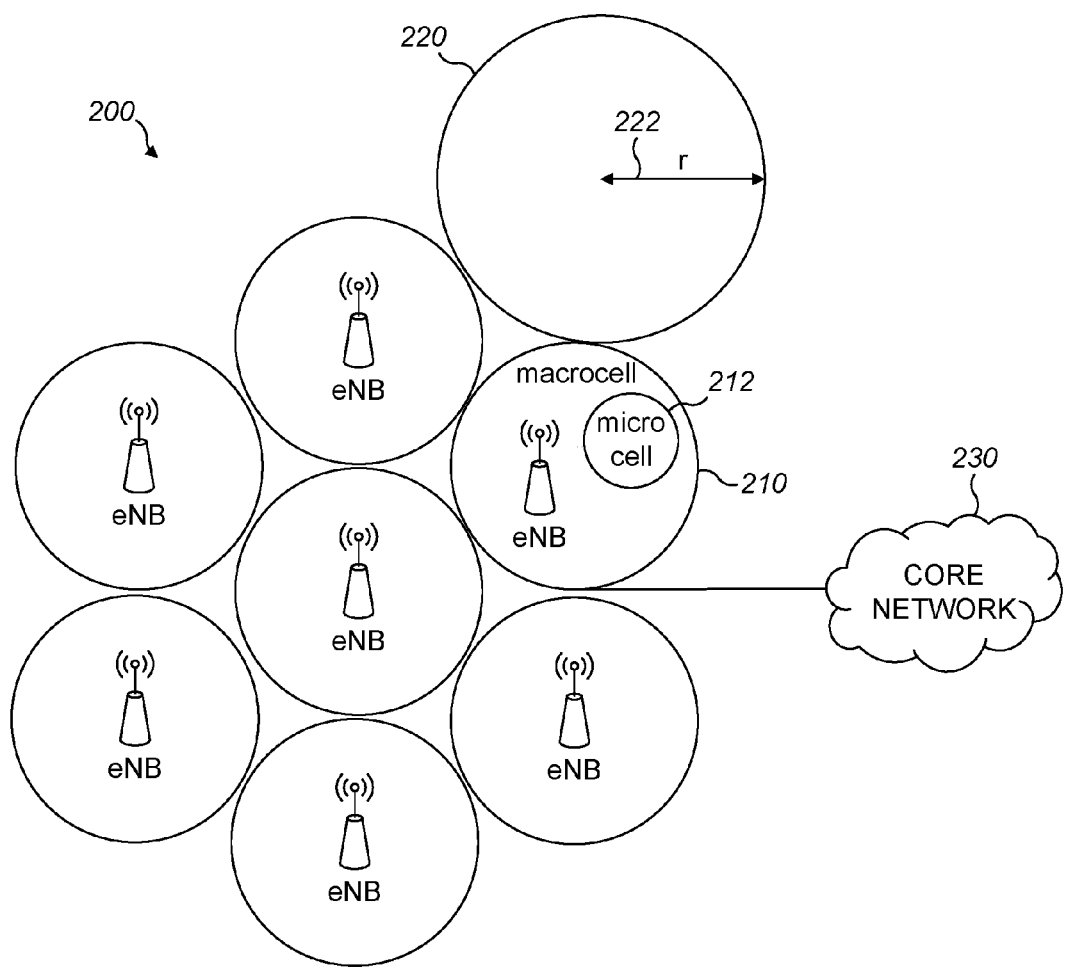
FIG. 2 schematically illustrates an array of circular cells connected to a core network.

FIG. 2 schematically illustrates a simple cell array 200 representing individual areas of radio coverage corresponding to antennas of a wireless network. The arrangement comprises a plurality of circular cells, each of which is associated with a single omnidirectional eNB at the cell site (in this case the cell centroid). A given macrocell 210 of the illustrated cell array spans a geographical range that also contains a smaller circular radio coverage area corresponding to a microcell 212. Each macrocell 210 has a characteristic radius, 222, which may vary from cell to cell. For simplicity the cell array 200 of FIG. 2 shows non-overlapping cells, but in practice there is typically partial overlap in the geographical coverage areas of adjacent cells at the cell boundaries. A cell boundary may be defined to correspond to a locus where a received signal strength from one eNB and its neighbour is approximately equal. The cell cluster 200, which communicates via radio frequency transmissions is connected to the packet-based core network 220 (e.g. the EPC 120 of FIG. 1).

In the arrangement of FIG. 2, each cell is served by a respective fixed-location network node and adjacent cells typically use different sets of carrier frequencies to reduce inter-cell interference. Higher carrier frequencies provide greater information carrying capacity but have reduced range relative to lower carrier frequencies. The cells of a cell array of a wireless communication network are logical constructs representing areas of radio coverage where the radio signal has at least a threshold signal strength. For the single-antenna circular cells of FIG. 2, the signal strength diminishes towards the outer periphery of the circle. Note that cells are not limited to being circular cells, but could be any type of polygon such as a hexagon. Hexagonal cells are useful for depicting a geographical area totally covered by a radio signal, without any gaps.

The cell size (or range) may vary with time and will depend upon factors including: prevailing radio propagation conditions; the frequency band utilised by the associated antenna; the antenna power; the radio access technology utilised (3G, 4G etc.); and the location environment (e.g. rural/city or indoor/outdoor). Each cell of a wireless network typically has a unique cell ID to identify that cell to the wireless network operator. In the case of a single omnidirectional antenna being associated with each cell then a single cell ID can be associated with the cell. However, in the case of a network node (e.g. eNB or nodeB) having a plurality of antennas (multi-directional antenna) covering different cell sectors (see FIG. 3), the cell ID may comprise one or more values (bits) to identify individual sectors within a given cell. Cells and sectors are broadly equivalent in the sense that they each represent radio coverage areas corresponding to an antenna. Typically in 4G systems an eNodeB will comprise three separate antennas, each spanning a different 120° sector surrounding the eNB and each antenna having a range depending upon characteristics of both the transmitted radio signal and the radio propagation environment.

Note that in some arrangements two or more cells may substantially (e.g. almost completely) overlap. This is likely to occur when the network node (eNB or nodeB) is configured to operate as a dual mode base station implementing two logical cells according to different respective radio access technologies, such as one cell operating according to a 3G standard and one cell corresponding to a 4G standard.

In a heterogeneous network (see FIG. 2), a single geographical area corresponding to a macrocell 210 may also comprise within its radio coverage range, a smaller cell such as the microcell 212 of FIG. 2. Picocells and/or femtocells may also have respective cells overlapping with the macrocell 210. Macrocells may have a range of, for example, from 0.8 km in urban areas up to 8 km in rural areas. Microcells may have a range of less than 2 km; picocells may have a range of less than 200 m; and femtocells may have a range of around 10 m.

As explained above, each radio cell can be uniquely identified using a cell ID allocated to it by the wireless network. In Long Term Evolution (4G), the cell ID (Evolved Universal Terrestrial Radio Access Network (E-UTRAN) Cell Identifier) may be obtained by the UE by decoding a System Information Block (SIB) from a Physical Downlink Shared Channel PDSCH) once per 10 ms radio frame. The cell ID (or E-UTRAN Cell Identifier), which differentiates between cells belonging to a specific operator, typically has a length of 28 bits and encapsulates an eNB identity. Cells are identified at a global level using their E-UTRAN Cell Global Identifier (ECGI), which comprises: (i) the 28-bit cell ID which encapsulates an eNB identity; (ii) a Mobile Country Code; and (iii) a Mobile Network Code, which uniquely identifies the operator. The eNB identity may be either a short eNB identifier have a length of either 20 bits (allowing 256 cells per eNB) or a long eNB identifier of 28 bits (allowing 1 cell per eNB).

The long (28 bit) eNB identifier can be used for sites having only a single cell etwork nodes with the increased range of values afforded by the 28 bits allowing for a large number of these sites within a network. The short (20 bit) eNB identifier can be used for any site that can be configured for more than a single cell. In the case of the short eNB identifier, the 8 remaining bits of the total 28 bits can be used, for example, to allocate sequential identities 0, 1 and 2 for a 3-sector site corresponding to a tri-directional antenna. Alternatively different ranges within the 8 bits can be used for different RF carriers and different operating bands. In a further alternative, different ranges may be used for different site types; e.g., values 0 to 9 for macrocells and values 10 to 19 for microcells. Thus the cell ID may be used to identify radio coverage areas corresponding to different cell types including macrocells, microcells, picocells and femtocells and to specify sectors corresponding to coverage areas associated with individual antenna directions of a multi-directional antenna.

Returning now to discussion of the analytics module 123 of FIG. 1, the network keeps track of a plurality of "events" associated with usage of the network by UEs and uses the analytics module 123 to collate and analyse these events. Events include single billable occurrences of network usage such as a UE making a call. A Charging Trigger Function (CTF) is a component in each network entity that generates charging and forwards charging events to a Charging Data Function (CDF) via a radio (Rf) interface. The CDF uses the received charging events to construct Charging Data Records (CDR) with well-defined content and format. The CDR comprises a UE event together with its attributes and it will be appreciated that different events (e.g. voice call, text message, internet download) may be captured by different network elements controlling the relevant services. Examples of attributes of a CDR are: calling party; called party; call start date and time; call duration; call type (voice, SMS, data etc.) and a unique sequence number identifying the event record. It is also possible to determine via analysis of the CDR data (or otherwise), the dwell time of a given UE within a particular cell and a number of consecutive events in the same cell for the given UE.

Apart from CDR events, information regarding the location of a UE may be derived from location area updates, which are routinely supplied by the UE to the network. For example periodic tracking area updating is used to periodically notify the availability of the UE to the network. The location area updates provide a locus for the UE at a given time based upon the cell ID of the cell that the UE is camped-on to. CDRs produced by the CDF are forwarded to a Charging Gateway Function (CGF), which acts as a gateway between the 3GPP network and a billing domain. The CDF and CGF (not shown) may be integrated in entities of the EPC 120 of FIG. 1, such as the PDN gateway 126 and/or the serving gateway 124. Alternatively the CDF and CGF may be integrated with the SGSN 146 of the 3G network 140 or even may alternatively be provided as standalone elements.

Various UE positioning methods may be deployed by the network and used to provide UE location events for use in the present technique in addition to or as an alternative to the CDRs. For example, an Observed Time Difference of Arrival (OTDA) method may be used. ODTA is a UE positioning method based on time differences measured by the UE on a downlink from different eNBs/NodeBs. Alternatively a satellite navigation positioning system such as GPS or enhanced cell ID methods can be used. Often UE location event information will have been obtained and stored in any case as part of another mobile network process such as UE handover preparation. Another convenient source of UE location event data is UE History Information, which was introduced in release 8 of the 3GPP specification. The contents of the UE history information are as shown in the Table 1 below.

TABLE 1

| | | Information Elements | |
|---|---|---|---|
| Last visited cell list (1 to 16 instances) | Last visited cell information | choice E-UTRAN (LTE/4G) Cell | Global Cell Identity Cell Type (very small, small, medium or large) Time UE stayed in cell |
| | | UTRAN (3G) cell | UTRAN cell identity Cell Type (femto, pico, micro or macro) Time UE stayed in cell |
| | | GERAN (2G) cell | |

The UE History information of table 1 is transferred by a source eNB to a target eNB during a handover procedure and the message is specified within the 3GPP TS 36.433 standard. E-UTRAN (LTE) cells are identified using their Global Cell Identity, which is a combination of a Public Land Mobile network (PLMN) identity and the cell ID. The UTRAN (3G) cell identity is signalled using a combination of PLMN identity, RNC identity and cell identity. Location events relating to respective UEs in given time periods are collected from one or more of the UE location sources including: CDRs, UE history information; GPS information; OTDA measurements, periodic UE location reports. The UE location event observations are collated the analytics module 123. The location event observation data for a unique cell corresponding to a particular PLMN (e.g. belonging to a given operator) is collected on a per-UE basis. Characteristics of the unique cell such as the cell size (e.g. radius) and centroid co-ordinates may be plotted on a map to form a 3D visualisation of a given UE's location over a time period, such as one week or any other finite period. The 3D visualisation is event-based such that for each observed event for the UE, a cylinder of unit height is plotted on a map and the cylinders generated by individual events are plotted cumulatively on the map. This means that in regions of overlap between two cells, the plot height in the region of overlap will correspond to the sum of UE observations in each of the overlapping cells.

Figure 3:
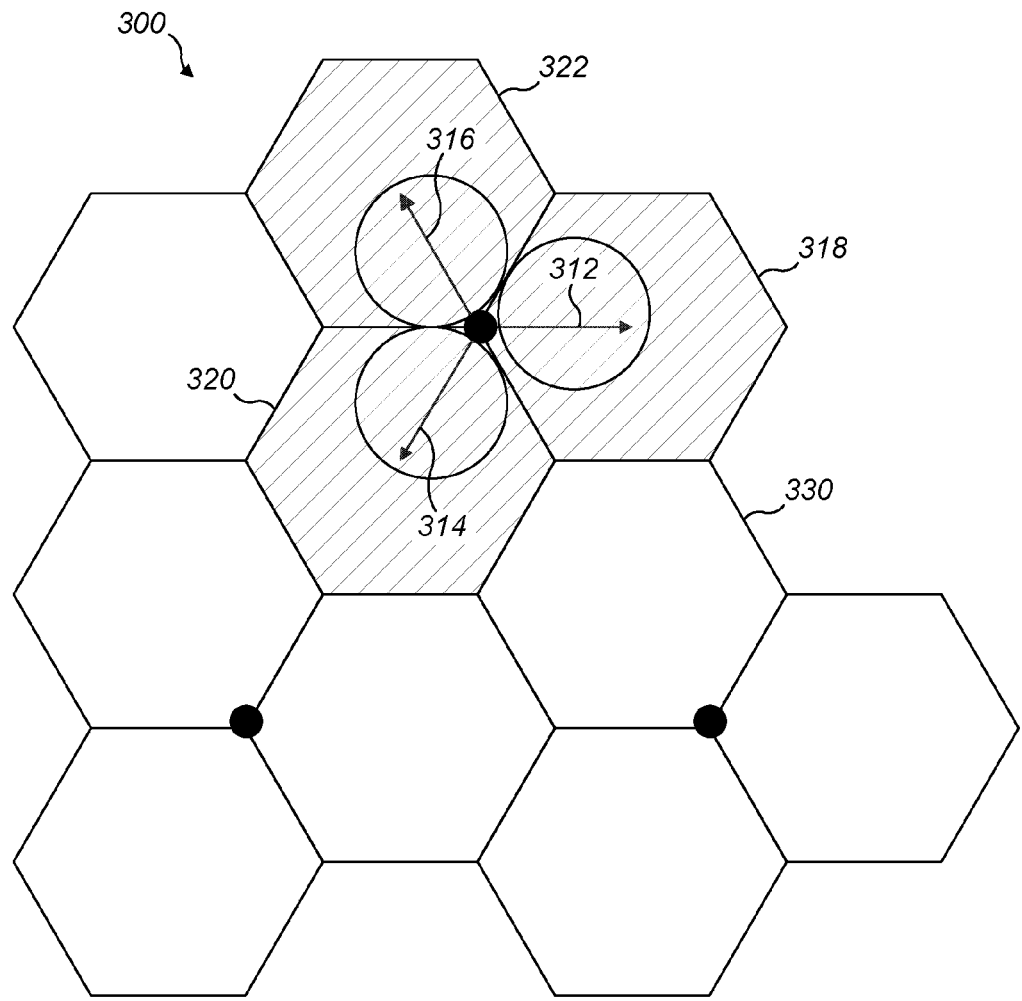
FIG. 3 schematically illustrates an array of hexagonal cells and cell sites having tri-directional antennae.

FIG. 3 schematically illustrates an alternative cell structure 300 comprising a plurality of hexagonal cells (whereas FIG. 2 illustrates a circular cell structure). In the FIG. 3 arrangement, an eNB 310 is a tri-sector eNB with three antennae pointing in the three different directions indicated by the arrows 312, 314, 316 corresponding respectively to hexagonal cells 318, 320 and 322. In this case, the eNB 310 is sited at a corner of the group of three hexagonal cells 318, 320, 322 on the edge of several cells, rather than at the cell centre. The three directional antennae 312, 314, 316 allow sectoring of a given cell into three 120° sectors, which allows for better control of interference. The coverage area corresponding to each antenna 312, 314, 316 is shown as a circle surrounding the antenna and extending from the cell site (eNB). In reality, the beam formed by each antenna 312, 314, 316 will have a more complex shape than a circle, but the circular coverage area representing only part of the area of a hexagonal cell provides a reasonable approximation of the actual coverage area. As explained above, individual sectors may be identified via a subset of bits of the cell ID. The number of sectors is not limited to three, but could be any number.

Figure 4:
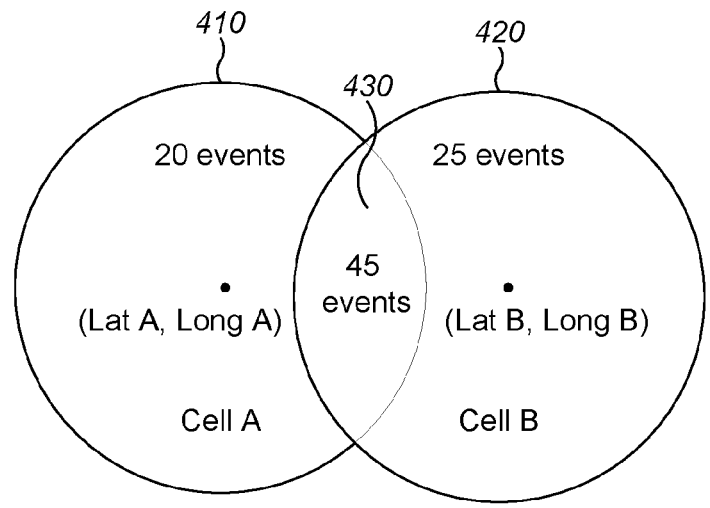
FIG. 4 schematically illustrates two overlapping cells and associated mobile terminal observation events.

FIG. 4 schematically illustrates two adjacent circular cells having a region of intersection. A first cell 410, labelled "cell A", is adjacent to a second cell 420, "cell B" and the two circular cells 410, 420 intersect in a region 430. The event location data received by the analytics module 123 of FIG. 1 records 20 location events for a given UE in cell A 410 and records 25 events in Cell B 420 over the same predetermined time period. This is visualised in a 3d plot such that cell A 410 has 20 unit cylinders plotted corresponding to its cell centroid and radius, RA, whilst cell B has 25 unit cylinders plotted corresponding to its own cell centroid and radius, RB. As a result, the overlap region 430 on the plot has a total height of 45 unit cylinders corresponding to 45 observed events for the given UE. This analysis reflects that fact that if a given UE has frequent observed location events in the two adjacent cells 410, 420 then it is likely that this is as a result of the UE being located on the periphery of the two cells, where the signal strength is small relative to the signal strength closer to the cell centroid, and this results in the UE frequently switching between the two cells, i.e., being subject to handover between cell A 410 and cell B 420 depending upon the prevailing relative signal strength of the eNB signal corresponding to the cell A 410 and the eNB signal corresponding to the cell B 420. In the hexagonal tri-antenna cells of FIG. 4, there will be similarly overlapping regions at the peripheries of the hexagons and the UE may flip between different sectors depending upon the relative signal strengths of signals corresponding to the different antenna associated respectively with the different sectors.

According to the present technique a static location for a UE such as, for example, a home cell, a work cell or a favourite location within a predetermined time period is calculated by utilising network data from a complex analysis, which is performed in any case by the network for other purposes, to calculate the centre of coverage of a cell (i.e. cell centroid) and the cell coverage area (i.e. an area where it is statistically likely for a phone to connect to the cell). The cell radius and cell coverage area are typically calculated based upon a finite number of received signal strength measurements, with criteria requiring a desired signal strength of at least a threshold value at the cell boundary. A linear regression calculation may be performed to take account of path loss as part of the estimation of the radius of reliable cellular coverage.

Estimation of the static location according to embodiments is based upon a simple count of a number of observed UE location events corresponding to a cell ID, but taking into account an overlap between two or more coverage areas (cells or sectors).

With reference to the cell arrangement of FIG. 4, a calculation is performed that involves weighting the importance of a given cell as a candidate for a preferred static location (e.g. home cell) based upon the number of observed UE location events in the cell:

1) If observations in cell A>cell B then the general area comprising cell A 410 is likely to be the home cell.
2) If observations in cell A>>cell B then the centroid of cell A 410 is a good estimate for the home location, because the best signal strength should be available at the cell centroid.
3) If observations in cell A are approximately equal to the observations in cell B then the centroid of the intersection between cell A & cell B (region 430) is a good estimate for the home location, because the UE regularly switches between the two cells due to the respective signal strengths typically being close in magnitudes.

Thus according to the present technique a combined measure involving location event frequencies for two (or more) cells is used to calculate a refined static location for the user terminal.

However, in terms of the 3D bar chart visualisation of the preferred static locations, relying upon the height of the 3D surface in the simple case of weighting each cell by the number of events, would result in the highest point would be in Centroid C, even for case 2) in the list above. Accordingly, some fine-tuning of the static location estimate is appropriate at least for the purposes of plotting a more accurate 3D visualisation.

Considering the example cell arrangement of FIG. 4 again, let the centroid of Cell A 410 have (x, y) coordinates (Lat A, Long) and let the centroid of Cell B have coordinates (Lat B, Long B), where "Lat" represents latitude and "Long" represents longitude on a map. Furthermore let ObsA be a number of UE observations (location events) in cell A in a given time period (i.e. an event frequency) and let ObsB be a number of UE observations (location events) in cell B in the same given time period (an event frequency).

In this simple case, the refined position of the home location (or other static location) would be given by the coordinates:

$$\text{Home location latitude} = \frac{(LatA \times ObsA) + (LatB \times ObsB)}{(ObsA + ObsB)} \quad \text{[equation 1a]}$$

$$\text{Home location longitude} = \frac{(LongA \times ObsA) + (LongB \times ObsB)}{(ObsA + ObsB)} \quad \text{[equation 1b]}$$

This calculation uses a different combined measure of location event frequencies from the embodiment of FIG. 4, by calculating a weighted sum incorporating a plurality of event frequencies rather than by comparing a difference of event frequencies for two different cells with a threshold value.

Thus the static location latitude is calculated as a mean value of latitudes corresponding to all observed events in the two cells, because the total number of events observed across the two cells in the time period is equal to (Obs A+Obs B). Although the UE may not actually be located at the cell centroid (or sector centroid) for the particular location event, all events corresponding to a particular cell ID are assumed to give a UE location corresponding to the centroid of the geographical area (cell or sector) corresponding to the cell ID. Only non-zero event frequencies will make a non-zero contribution, and hence a refinement, to the weighted sum of cell coordinates.

In the example of equations 1a and 1b, the weightings correspond to the number of observed events. In alternative embodiments, the weightings used to calculate the static location coordinates may comprise at least one of: a dwell time of the UE in the different cells, a number of consecutive location events occurring in the same cell and a radius of the cell/sector or other cell/sector size parameter (e.g. diameter). These weighting factors and the event counts and be combined in any one of a plurality of different ways to calculate a refined characteristic location. For example, taking the radius of the cells (where RA is the radius of cell A and RB is the radius of cell B) and incorporating this as a weighting factor, according to one embodiment gives the following equations for home latitude and longitude:

$$\text{Home location latitude} = \frac{(LatA \times ObsA/RA) + (LatB \times ObsB/RB)}{(ObsA/RA + ObsB/RB)} \quad \text{[equation 1a*]}$$

$$\text{Home location longitude} = \frac{(LongA \times ObsA/RA) + (LongB \times ObsB/RB)}{(ObsA + ObsB)} \quad \text{[equation 1b*]}$$

It will be appreciated that the particular equations for home attitude and longitude may incorporate one or more parameters such as the number of observed events, the cell radius, dwell time and the number of consecutive events in the weightings in a variety of different ways and not only as specified above.

Considering now a numerical example using a simple co-ordinate system (e.g. as illustrated in FIG. 4) with coordinates spanning a range 0-100 in both Latitude and Longitude and using equations 1a and 1b:

(30, 20) is the (Latitude, Longitude) position of centroid of cell A (40, 60) is the (Latitude, Longitude) position of centroid of cell B 10 is number of phone observations in cell A (event frequency in Cell A)

15 is number of phone observations in cell B (event frequency in Cell B)

$$\text{Home location latitude} = \frac{(30 \times 10) + (40 \times 15)}{(10 + 15)} = 36$$

$$\text{Home location longitude} = \frac{(20 \times 10) + (60 \times 15)}{(10 + 15)} = 44$$

Depending upon a desired accuracy in the location estimate, the latitude and longitude can be defined at an appropriate level of granularity. It may be sufficient, for example, to pinpoint location to a particular postcode or a city quarter, so specifying a latitude/longitude to within approximately 100m may be adequate.

Figure 5:
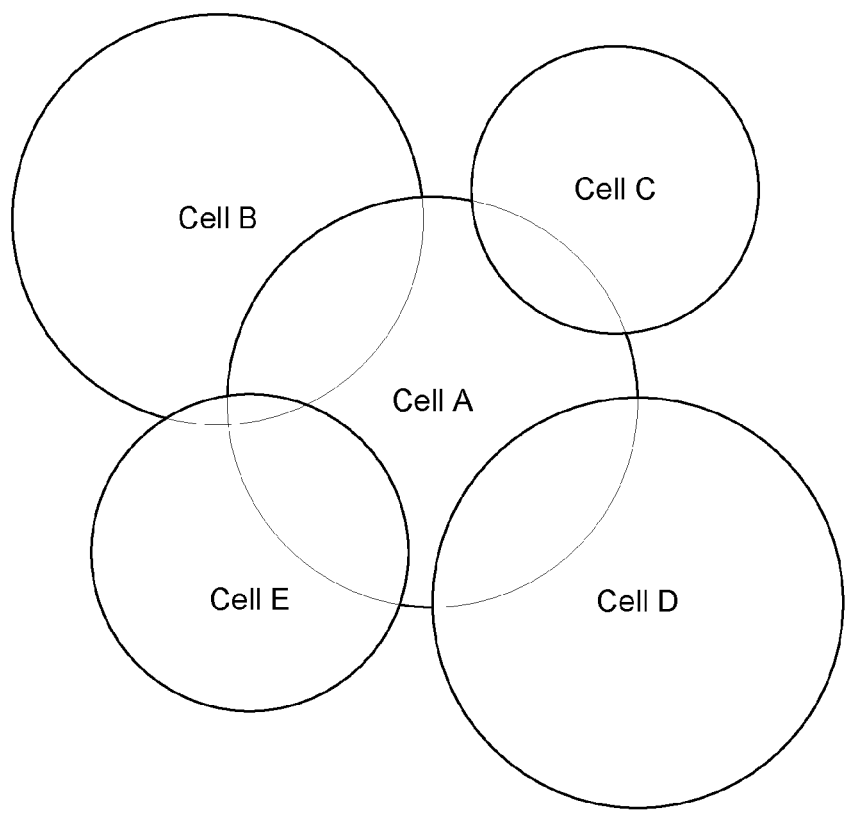
FIG. 5 schematically illustrates a highest incidence circular cell and four overlapping circular cells of various sizes.

The example of FIG. 4 can be extended to include more than two cells in the refinement of the static location as shown in FIG. 5. In the example of FIG. 5, Cell A 510 is the cell having the highest number of UE location event observations in a predetermined time period, but four adjacent cells also have observed events for the UE within the same time period. The four adjacent cells are: Cell B 520; Cell C 530; Cell D 540; and cell E 550. In this case the static location latitude and longitude are calculated as follows.

Home location latitude=(LatA×ObsA)+(LatB×
ObsB)+(LatC×ObsC)+(LatD×ObsD)+(LatE×
ObsE)(ObsA+ObsB+ObsC+ObsD+ObsE)

Home location longitude=(LongA×ObsA)+(LongB×
ObsB)+(LongC×ObsC)+(LongD×ObsD)+
(LongE×ObsE) (ObsA+ObsB+ObsC+ObsD+
ObsE)

Thus, similarly to the example above that takes just two overlapping cells into account, the example of FIG. 5 extends the refinement of the static location to include a larger number of cells (more than two) for which events are observed for a given UE in the predetermined time period. The mean value of individual location coordinates corresponding to all events in all of the cells is calculated. This is equivalent to weighting a set of coordinates corresponding to cell sites (e.g. centroids corresponding to the cell ID) by the number of observed events in each cell in order to calculate a mean UE location based on the total number of observed events.

Figure 6:
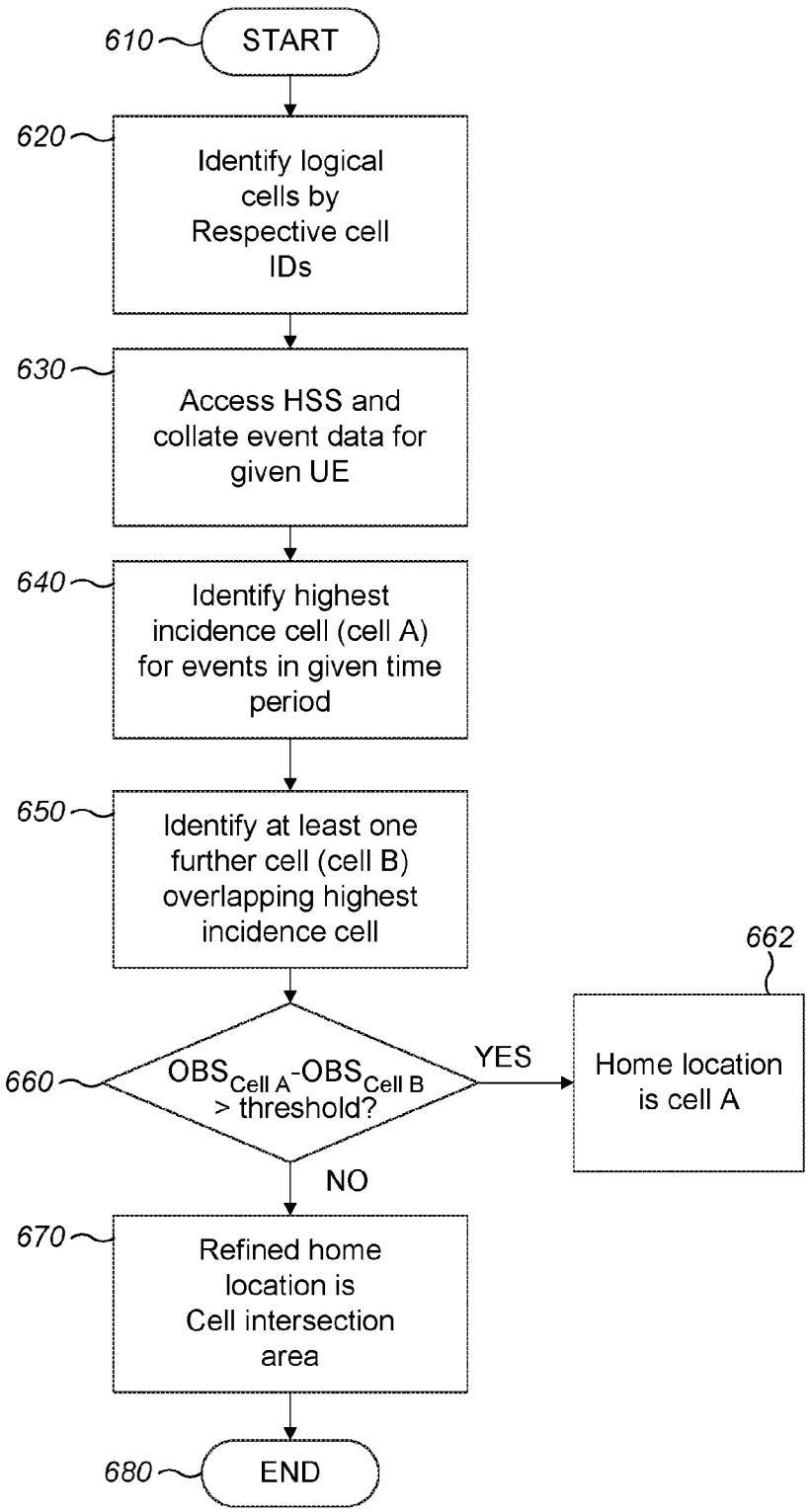
FIG. 6 is a flow chart schematically illustrating a mobile terminal static location estimation refinement according to a first embodiment.

FIG. 6 is a flow chart that schematically illustrates a method of static location estimation by an analytics engine according to a first embodiment. The method starts at a process element 610 and proceeds to a process element 620, where the system accesses network data relating to eNodeB coverage areas (cells and sectors) including cell IDs, cell radii and cell centroids. Each coverage area (cell or sector) is uniquely identifiable for a given PLMN based upon the cell ID. Next, at process element 630, the analytics engine accesses the HSS (122) and/or other network sources of UE location events, such as the CDF and CGF and UE History Information. Once the UE location event observations have been obtained, the process proceeds to a process element 650, where the cell (or sector or coverage area) having the highest number of observed events in a given time period is identified as the highest incidence cell. When the time period corresponds to an overnight period, this relates to determining a static location corresponding to a home location. When the time period instead corresponds to a daytime period, the static location may correspond, for example, to a work location or school location. In this example, the highest incidence cell will be denoted cell A. Next, at process element 650, the analytics module 123 processes the UE location event data to identify at least one further cell having event(s) associated with the given UE and having an overlapping coverage area relative to cell A. In the simplest case, a single overlapping cell having the second highest event incidence is selected.

Next, at a process element 660, the analytics engine performs a simple comparison between the magnitude of the difference between the number of event observations in Cell A and the number of event observations in Cell B and a threshold value. The threshold value may be predetermined or may be configurable. If at process element 660 it is found that a magnitude of the difference in the number of observations between the two highest incidence overlapping cells is greater than the threshold value, then the process proceeds to process element 662, where the home location is set to Cell A. This is because a difference above the threshold indicates that the UE only infrequently camps on to Cell B, but is primarily observed as being located in Cell A.

However, if it is instead found at process element 660 of FIG. 6 that the difference in observation event numbers between Cell A and Cell B is less than or equal to the threshold, it is likely that this is due to the UE being located in a coverage region where the radio frequency signal from Cell A is of a similar strength to the radio frequency signal from Cell B. This can result in the UE frequently being handed over between Cell A and Cell B. As a result, at a process element 670, the refined home location is set to the area of intersection of Cell A and Cell B. In particular, the home location is set to the centroid of the area of intersection. In alternative embodiments the home location is set to a point in the area of intersection other than the centroid. The process then ends at process element 680.

Figure 7:
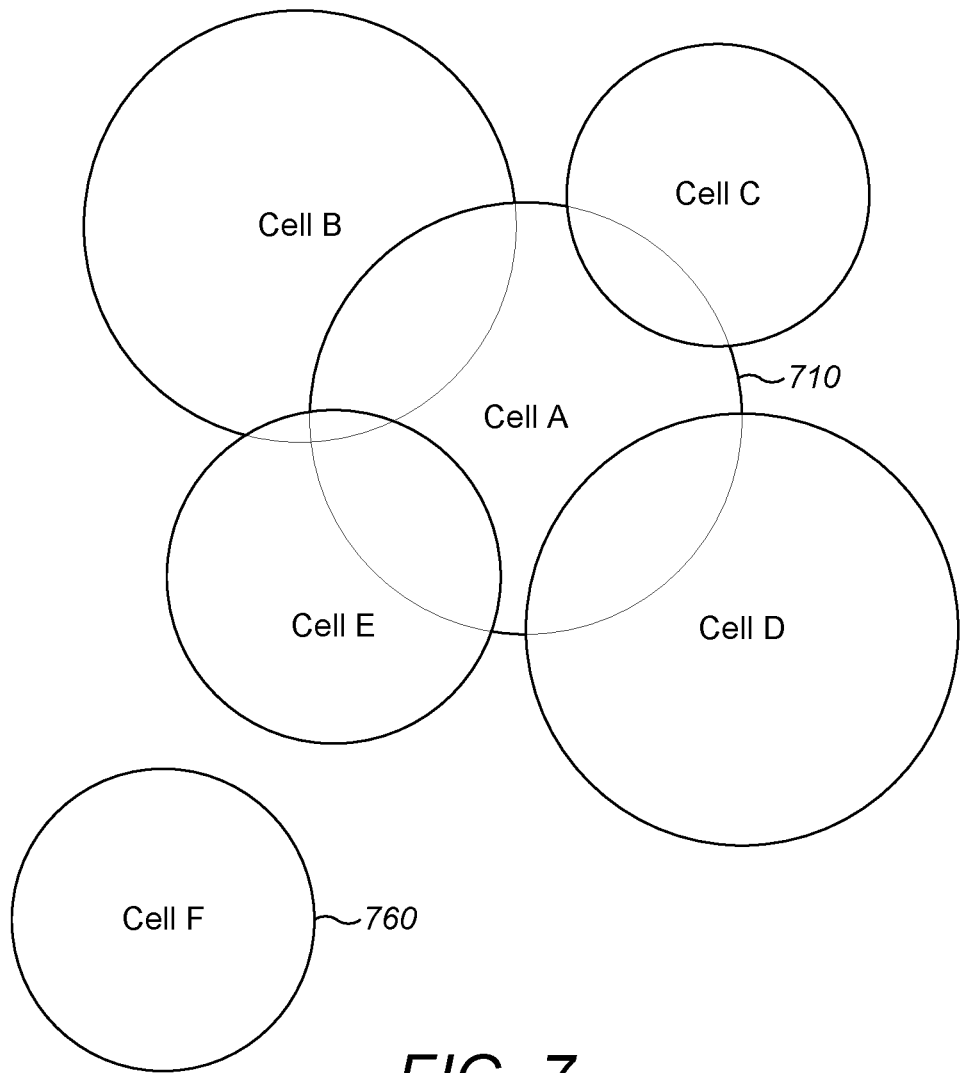
FIG. 7 is schematically illustrates a plurality of circular cells each of which has observed location events corresponding to a given mobile terminal in a finite time period.

FIG. 7 schematically illustrates a set of cells corresponding to a UE location in a given time period. In each of Cell A, Cell B, Cell C, Cell D, Cell E and Cell F, at least one location event has been observed by the analytics module 123 according to the present technique. Cell A, 710, has the highest number of events, so would correspond to the home location according to a rough approximation. Note that whilst Cell B, Cell C, Cell D and Cell E are all adjacent to Cell A and overlap Cell A, Cell F has a range that does not overlap with Cell A. In calculating a refined home location according to the present technique, selecting which cells from the observed UE location events data set to use in the refined location is important.

Considering a simple case, then the cell with the highest number of observations during 'night time' e.g. 22:00 hrs to 06:00 hrs would be the home cell, e.g. Cell A 710 in FIG. 7. This will effectively disregard user activity of the UE such as late nights and trips away provided that a reasonable amount of time is spent in the home location.

However, to establish a more accurate static location such as a home location, cells other than the cell with the highest event count may be taken into account, although a mean location weighted according to numbers of events could take account of all cells in which at least one UE location event is observed in the predetermined period, it may be appropriate in some embodiments to select but only a subset of cells (or cell IDs) having UE location events in the predetermined period.

In one embodiment, to provide a refined estimate of home location relative to an estimate simply based on the cell having the highest event count, a subset of cells in which location events have occurred in the time period are selected. For example, in FIG. 7, UE location events are observed in each of the six illustrated cells, but Cell F 760 events are excluded from the weighted mean location calculation because this cell is non-overlapping with the cell having the highest incidence of event observations, cell A 710. Other criteria may be used for selecting the particular subset of cells to include in the refined static location calculation.

Calculation of the static location according to the present technique, which takes account of two or more cell IDs and associated location event observations to estimate a static location of a UE in a given time period provides a more accurate estimate of a home location (or other static location) relative to previously known methods that simply estimate the home location such that it is assumed to correspond to the cell centroid that has the highest amount of phone activity overnight. According to the present technique, the static location estimation provides improved accuracy and this has been observed empirically based on some data sets. The technique is cost effective and straightforward to implement because it makes use of information that is already obtained by the wireless network for other purposes. This re-used data includes CDR data, which is required for billing purposes, and location area updates, which are used for call set-up and handover. The technique is also computationally simple, which makes it suitable for high volume data analytics and it does not appreciably impact upon data storage needs due to the information reuse.

Figure 8:
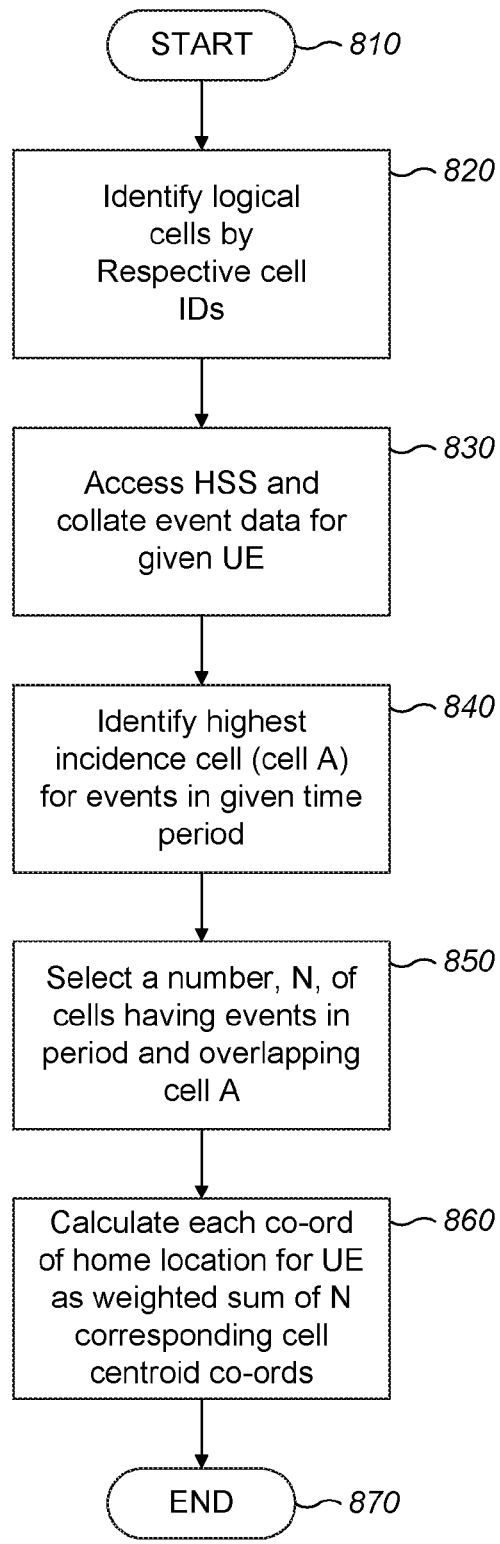
FIG. 8 is a flow chart schematically illustrating a mobile terminal static location estimation refinement according to a second embodiment.

FIG. 8 is a flow chart that schematically illustrates a method of static location estimation by the analytics module according to a second embodiment. Process elements 810, 820, 830 and 840 of FIG. 8 correspond respectively to process elements 610, 620, 630 and 640 of the flow chart of FIG. 6 and the same processes are performed as described above in relation to FIG. 6. However, the process of FIG. 8 differs from that in FIG. 6, because at process element 850 a calculation different from the threshold comparison of FIG. 6 process element 650 is performed. In particular, at process element 850, the location event data for the UE is analysed to identify all cells, other than the highest incidence cell identified at process element 840, having one or more events in a given time period. At least a subset, comprising an integer number N of these identified cells is selected for inclusion in the refined static location calculation. For example, the subset of N cells having at least some overlap in coverage with the highest incidence cell, cell A, may be selected as illustrated in FIG. 5 and in FIG. 7.

The calculation then proceeds to process element 860 where a latitude coordinate of the estimated static home location is calculated based upon a weighted sum of the N latitude coordinate vales for the N identified cells and the latitude coordinate value for Cell A. The weighting for each term in the latitude sum is the number of observed events in the corresponding cell and the sum is normalised by the total number of observed events in all N cells and in cell A. The longitude coordinate of the estimated static home location is calculated in a similar way, based upon an event-weighted sum of (N+1) cell coordinate values. The process ends at element 870.

One or more software programs that may implement or utilize the various techniques described in the embodiments may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. The program instructions may be provided on a transitory or a non-transitory medium. Where functionality has been described as being implemented by means of software that functionality could equally be implemented solely in hardware (for example by means of one or more ASICs (application specific integrated circuit)) or indeed by a mix of hardware and software.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

It should be understood that where the functional units described in this specification have been labelled as modules, this is to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executable program code of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions. The modules may be implemented at least in part in a cloud computing environment, where processing functions are distributed across different geographical locations.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. Method for estimating a characteristic static location of a user equipment in a wireless communication network comprising a plurality of network nodes for transmitting radio signals, each network node having an associated cell corresponding to a predicted geographical coverage area of a corresponding transmitted radio signal, the method comprising:

receiving location event data for the user equipment, each of a plurality of location events of the location event data providing a cell-specific location for the user equipment at a point in time;

determining a plurality of event frequencies for the user equipment, each event frequency corresponding to a cumulative number of received location events locating the user equipment in a respective cell and/or sector in a given time interval; and calculating the characteristic static location using a combined measure of at least two non-zero values of the plurality of event frequencies corresponding respectively to at least two different cells or sectors, wherein the combined measure of event frequencies is a weighted mean of spatial coordinates corresponding to the at least two different cells or sectors, wherein the weightings depend upon the event observation frequencies and the weightings further depend on at least one of:

an observed dwell time of the user equipment in a respective cell/sector of the at least two different cells/sectors;

a cell/sector radius of the at least two different cells/sectors; or a number of consecutive location events for the respective cell or sector.

2. The method of claim 1, wherein the at least two non-zero values of the plurality of event frequencies correspond to two at least partially overlapping cells or sectors.

3. The method of claim 2, wherein the combined measure of event observation frequencies comprises determining the characteristic static location to be in an overlap region of the two at least partially overlapping cells when a difference between respective event frequencies for the two different cells or sectors is less than a predetermined threshold.

4. The method of claim 1, wherein the spatial coordinates for the weighted mean comprise coordinates of a centroid of the respective cell or sector.

5. The method of claim 1, wherein the cell-specific location comprises a unique cell identifier.

6. The method of claim 5, wherein the unique cell identifier corresponds to a sector served by one direction of a multi-directional antenna.

7. The method of claim 1, wherein the observation events correspond to at least one of: a call being received at the user equipment, a call being transmitted from the user equipment, sending of a short messaging service message, a periodic location area update for the UE and a Packet Data Protocol context setup for the user equipment.

8. The method of claim 1, wherein the characteristic static cell location corresponds to a home cell and wherein one of the at least two non-zero values corresponds to a highest incidence cell having a highest frequency count for event observations in the given time interval.

9. The method of claim 8, wherein the combined measure of at least two non-zero values of the plurality of event frequencies comprises three or more non-zero values corresponding to the highest incidence cell and two or more cells, each having at least a partial overlap with the highest incidence cell.

10. The method of claim 1, wherein the wireless communication network is a heterogeneous network comprising at least two cell types selected from macrocells, microcells, picocells and femtocells and wherein the at least two different cell types comprise different cell types.

11. Apparatus for estimating a characteristic static location of a user equipment in a wireless communication network comprising a plurality of network nodes for transmitting radio signals, each network node having an associated cell corresponding to a predicted geographical coverage area of a corresponding transmitted radio signal, the apparatus comprising an analytics module having a processor configured to:

receive location event data for the user equipment, each of a plurality of location events of the location event data providing a cell-specific location for the user equipment at a point in time;

determine a plurality of event frequencies for the user equipment, each event frequency corresponding to a cumulative number of received location events locating the user equipment in a respective cell and/or sector in a given time interval;

calculate the characteristic static location using a combined measure of at least two non-zero values of the plurality of event frequencies corresponding respectively to at least two different cells or sectors, wherein the combined measure of event frequencies is a weighted mean of spatial coordinates corresponding to the at least two different cells or sectors, wherein the weightings depend upon the event observation frequencies and the weightings further depend on at least one of:

an observed dwell time of the user equipment in a respective cell/sector of the at least two different cells/sectors;

a cell/sector radius of the at least two different cells/sectors; or a number of consecutive location events for the respective cell or sector.

12. A computer program product embodied on a non-transitory computer-readable medium comprising program instructions configured such that when executed by processing circuitry causes the processing circuitry to implement the method of claim 1.

* * * * *